United States Patent
Linderyd et al.

(10) Patent No.: US 7,261,084 B2
(45) Date of Patent: Aug. 28, 2007

(54) ARRANGEMENT AND METHOD FOR CONTROLLING COMBUSTION IN A COMBUSTION ENGINE

(75) Inventors: Johan Linderyd, Sundbyberg (SE); Fredrik Agrell, Älvsjö (SE)

(73) Assignee: Scania CV AB (Publ) (SE)

( * ) Notice: Subject to any disclaimer, the term of this patent is extended or adjusted under 35 U.S.C. 154(b) by 22 days.

(21) Appl. No.: 10/566,889

(22) PCT Filed: Aug. 19, 2004

(86) PCT No.: PCT/SE2004/001212

§ 371 (c)(1),
(2), (4) Date: Mar. 22, 2006

(87) PCT Pub. No.: WO2005/019627

PCT Pub. Date: Mar. 3, 2005

(65) Prior Publication Data
US 2006/0225704 A1    Oct. 12, 2006

(30) Foreign Application Priority Data
Aug. 20, 2003 (SE) .................................... 0302247

(51) Int. Cl.
F02D 13/02 (2006.01)
F02B 1/12 (2006.01)
F02M 25/07 (2006.01)
(52) U.S. Cl. ................. 123/435; 123/27 R; 123/90.15; 123/568.14
(58) Field of Classification Search ............... 123/27 R, 123/90.11, 90.12, 90.15, 435, 568.14, 568.21
See application file for complete search history.

(56) References Cited

U.S. PATENT DOCUMENTS

| 6,230,683 | B1 * | 5/2001 | zur Loye et al. | ............ 123/435 |
| 7,073,466 | B2 * | 7/2006 | Bauer et al. | .............. 123/27 R |
| 7,204,213 | B2 * | 4/2007 | Weber et al. | ............ 123/90.15 |

FOREIGN PATENT DOCUMENTS

| DE | 101 06 169 A1 | 8/2002 |
| WO | WO98/10179 | 3/1998 |
| WO | WO 00/28197 | 5/2000 |

* cited by examiner

*Primary Examiner*—T. M. Argenbright
(74) *Attorney, Agent, or Firm*—Ostrolenk, Faber, Gerb & Soffen, LLP

(57) ABSTRACT

An arrangement and a method for controlling a combustion engine, e.g. of the type called HCCI engine. A control unit is operable for controlling the self-ignition of the fuel mixture towards an optimum crankshaft angle ($cad_{iopt}$) within a load range ($L_{tot}$). The load range ($L_{tot}$) can be divided into at least two subranges ($L_{II}$, $L_{III}$). The control unit is operable to controlling the self-ignition of the fuel mixture towards an optimum crankshaft angle ($cad_{iopt}$) within one of the subranges ($L_{II}$) by a strategy (II) which entails the effective compression ratio (c) in the cylinder being varied, and within the second subrange ($L_{III}$) by another strategy (III) which entails a variable amount of cooled exhaust gases (ceg) being led to the combustion chamber also enabling in the second subrange ($L_{III}$) to control the self-ignition of the fuel mixture towards an optimum crankshaft angle ($cad_{iopt}$) by variation of the effective compression ratio (c) in the cylinder without it falling below a lowest acceptable value ($C_{min}$).

20 Claims, 4 Drawing Sheets

ARRANGEMENT AND METHOD FOR CONTROLLING COMBUSTION IN A COMBUSTION ENGINE

CROSS REFERENCE TO RELATED APPLICATION

The present application is a 35 U.S.C. §§ 371 national phase conversion of PCT/SE2004/001212, filed 19 Aug. 2004, which claims priority of Swedish Application No. 0302247-2, filed 20 Aug. 2003. The PCT International Application was published in the English language.

BACKGROUND TO THE INVENTION, AND STATE OF THE ART

The present invention relates to an arrangement and a method for controlling a combustion engine and particularly relates to strategies for adjusting the combustion process responsive to certain engine conditions.

One type of such combustion engines are called HCCI (Homogeneous Charge Compression Ignition) engines and may be regarded as a combination of an Otto engine and a diesel engine. In HCCI engines, a homogeneous mixture of fuel and air is compressed in a combustion chamber until self-ignition of the fuel mixture takes place. Advantages of such engines are that they produce low discharges of nitrogen oxides $NO_x$ and soot particles while at the same time being of high efficiency. One reason for HCCI engines not being used conventionally to any great extent is that it is difficult to control the self-ignition of the fuel mixture to a correct crankshaft angle.

Two different valve control strategies are known for controlling under laboratory conditions the self-ignition of the fuel mixture. The first strategy refers to closing the exhaust valve before the combustion chamber has been emptied of exhaust gases from a preceding combustion process and to opening the inlet valve later than usual. Such a so-called negative overlap results in a varying amount of exhaust gases being retained in the combustion chamber for a subsequent combustion process. The hot exhaust gases retained in the combustion chamber raise the temperature of the fuel mixture for the subsequent combustion process. A suitable amount of exhaust gases retained can thus cause the fuel mixture to have an initial temperature such that it self-ignites at a substantially optimum crankshaft angle.

The second strategy refers to controlling the closing of the inlet valve. The compression ratio in the cylinder can be varied by varying the crankshaft angle at which the inlet valve closes. The later the inlet valve closes, the shorter the piston movement required for compression of the fuel mixture. Varying the inlet valve closure and hence the effective compression ratio in the cylinder makes it possible for self-ignition of the fuel mixture to take place at a substantially optimum crankshaft angle.

A disadvantage of the aforementioned strategies is that they provide control of self-ignition in an HCCI engine within a relatively limited load range. Most technical applications need an engine which can be used over a relatively large load range.

SUMMARY OF THE INVENTION

The object of the present invention is to provide an arrangement and a method for providing effective control of the self-ignition of a combustion engine of the kind mentioned in the introduction so that it can be used across a relatively large load range.

This object is achieved with our arrangement varies the combustion process responsive to certain engine conditions. This involves applying, within a subrange, a strategy which entails the effective compression ratio in the cylinder being varied. By suitable variation of the compression ratio in the cylinder, self-ignition of fuel mixtures for different loads can be caused to take place at a substantially optimum crankshaft angle. This strategy may be applied in a subrange within which there are a lowest load at which an optimum compression ratio prevails and a highest load at which the effective compression ratio has been reduced to a minimum acceptable value. Such limitation to a minimum acceptable value is necessary in cases where reducing the effective compression ratio causes the lambda value to drop and hence the acid content A3

This object is achieved with our arrangement varies the combustion process responsive to certain engine conditions. This involves applying, within a subrange, a strategy which entails the effective compression ratio in the cylinder being varied. By suitable variation of the compression ratio in the cylinder, self-ignition of fuel mixtures for different loads can be caused to take place at a substantially optimum crankshaft angle. This strategy may be applied in a subrange within which there are a lowest load at which an optimum compression ratio prevails and a highest load at which the effective compression ratio has been reduced to a minimum acceptable value. Such limitation to a minimum acceptable value is necessary in cases where reducing the effective compression ratio causes the lambda value to drop and hence the acid content of the exhaust gases to decrease. Lowering the lambda value results in corresponding pressure rises and increased emissions. At higher loads than this strategy caters for, the control unit applies a strategy which entails cooled exhaust gases being led to the combustion chamber. The cooled exhaust gases cause the ignition of the fuel mixture to take place later. This means that the control unit can raise the effective compression ratio in the cylinder and the lambda value, resulting in the possibility of more fuel being supplied to the fuel mixture in the combustion chamber, and in a higher engine load being achieved. This strategy is therefore applicable within a load range which is higher than and adjacent to the load range for the strategy which only entails the effective compression ratio in the cylinder being varied. The control unit applying different strategies within various mutually adjacent subranges makes it possible for self-ignition to be controlled towards an optimum crankshaft angle within a relatively large load range.

According to a preferred embodiment of the present invention, the control unit is adapted to regulating the effective compression ratio in the cylinder by initiating variable inlet valve closure. Inlet valve closure variation is an uncomplicated way of regulating the effective compression ratio. The later the inlet valve closes, the shorter the piston movement in the cylinder required for compressing the fuel mixture. With advantage, the arrangement comprises at least one hydraulic control system for lifting the inlet valve and the exhaust valve. Such hydraulic systems which quickly vary the inlet valve closure from one combustion process to another in response to control signals received from the control unit are conventionally available.

According to a preferred embodiment of the present invention, the arrangement comprises a return line extending from an exhaust line of the combustion engine to an inlet line for air supply to the combustion chamber. This enables exhaust gases from previous combustion processes to be mixed in with the air and led to the combustion chamber.

With advantage, the return line comprises a valve for controlling the supply of exhaust gases to the inlet line. In such cases the control unit controls the valve so that a specified amount of exhaust gases is supplied to the combustion chamber. The return line preferably comprises a cooler for cooling the exhaust gases before they reach the inlet line. Such a cooler enables the exhaust gases to be brought to a substantially specified temperature before they are led into the combustion chamber.

According to another preferred embodiment of the present invention, the arrangement comprises a first sensor for detecting a parameter which indicates the start of a combustion process in the combustion chamber, and a second sensor for estimating the crankshaft angle of the combustion engine, and the control unit is adapted to determining the crankshaft angle at the start of the combustion process. Said first sensor may be a pressure sensor which detects the pressure in the combustion chamber. The control unit can use information about the pressure characteristic in the combustion chamber for determining the crankshaft angle at which the self-ignition has taken place. The first sensor may alternatively be a sonic sensor or some other suitable sensor by which self-ignition in the combustion chamber can be detected. The second sensor may be a sensor which detects the rotational position of, for example, the engine's flywheel. The control unit is preferably adapted to comparing the actual crankshaft angle at the self-ignition of the combustion process with stored information concerning the optimum crankshaft angle for self-ignition of the combustion process and to using this information for controlling the self-ignition of the following combustion process. The control unit can calculate the difference between the actual crankshaft angle at self-ignition of the combustion process with stored information about the optimum crankshaft angle. Thereafter the control unit controls the lifting of the valves in such a way as to eliminate during the next combustion process any difference thus calculated.

According to another preferred embodiment of the present invention, the arrangement comprises an inlet line for air supply to the combustion chamber, and an injection nozzle for fuel injection into the combustion chamber. In this case, the air and the fuel are supplied separately to, and become mixed in, the combustion chamber. Alternatively, the air and fuel may be mixed outside to form fuel mixture and be led together into the combustion chamber.

The object of the invention is also achieved by the method of the kind mentioned in the introduction which is characterised by the features indicated in the characterising part of claim 11. Using two different strategies for controlling the self-ignition of the fuel mixture within different but mutually adjacent load subranges enables continuous control, within a relatively broad load range, of the self-ignition of the type of combustion engines usually called HCCI engines.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
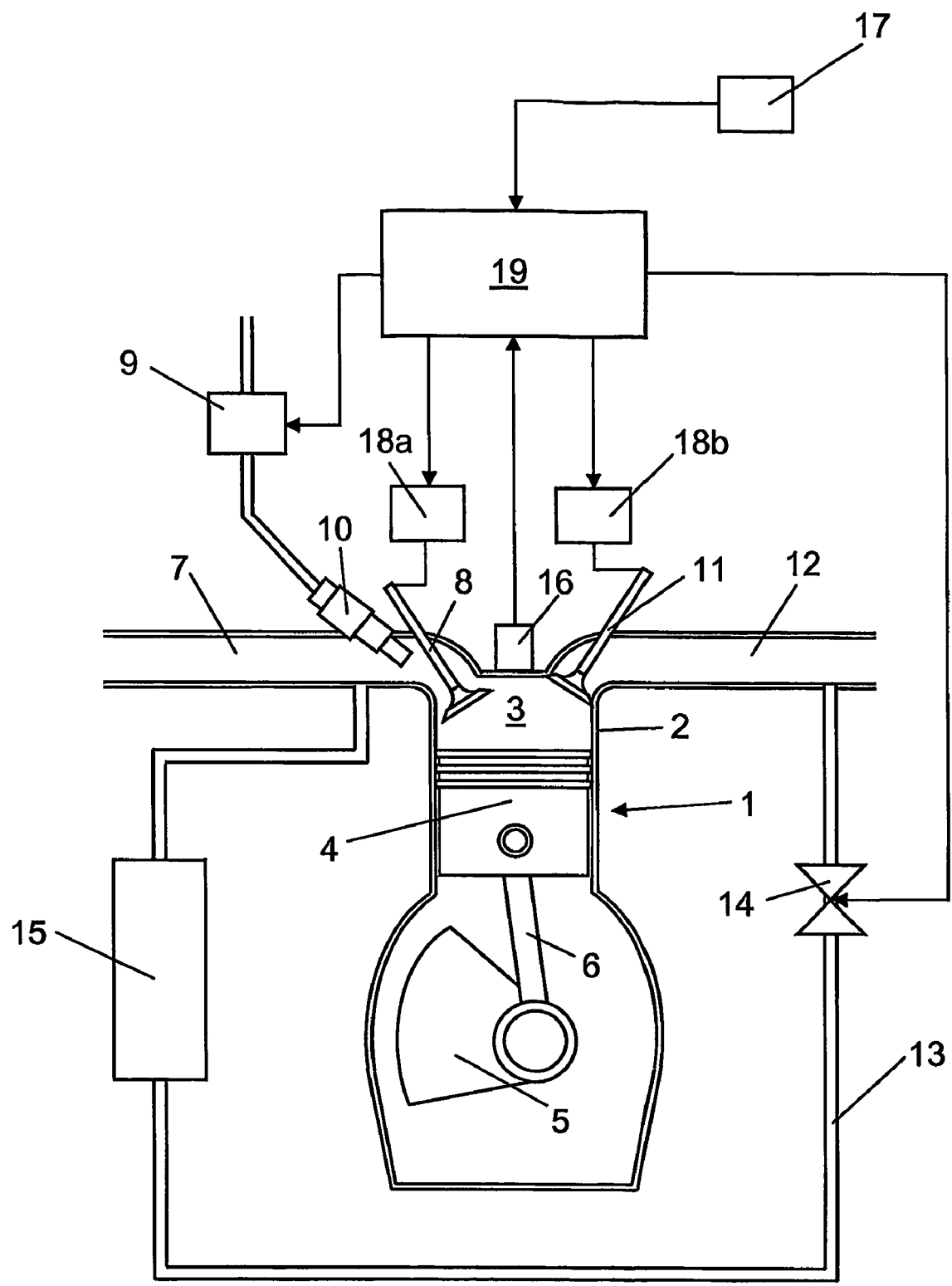
FIG. 1 depicts a combustion engine with an arrangement according to the present invention.

FIG. 1 depicts an arrangement for controlling a combustion engine 1 of the type in which a homogeneous mixture of fuel and air is compressed until self-ignition of the mixture takes place due to the heat arising during the compression. Such an engine 1 is usually called an HCCI (Homogeneous Charge Compression Ignition) engine. An HCCI engine may be regarded as a combination of an Otto engine and a diesel engine. A cylinder 2 of the engine 1 is depicted here. The engine 1 may of course have substantially any desired number of such cylinders 2. The engine 1 comprises a combustion chamber 3 which is bounded downwards in the cylinder 2 by a movable piston 4. The piston 4 is connected to a crankshaft 5 by a connecting rod 6. The movements of the piston 4 in the cylinder 2 are converted to rotary movement of the crankshaft 5.

When the piston 4 moves downwards in the cylinder 2 and an inlet valve 8 is open, air is drawn into the expanding combustion chamber 3 via an inlet line 7. At the same time, a fuel pump 9 injects fuel into the combustion chamber 3 via an injection nozzle 10. The inlet valve 8 usually closes at the stage when the piston 4 changes direction at an extreme bottom position. The subsequent upward movement of the piston 4 causes compression of the fuel mixture in the combustion chamber 2. The fuel mixture undergoes a temperature increase which is related to the degree of compression. Substantially at the stage when the piston 4 passes an extreme top position in the cylinder 2, the fuel mixture should have reached the temperature at which self-ignition of the fuel mixture takes place. During the combustion process, powerful expansion occurs in the combustion chamber 3 and the piston 4 is pushed downwards. When the piston 4 has passed the extreme bottom position, an exhaust valve 11 opens. The piston 4 moving upwards then pushes the exhaust gases formed during the combustion process out via the exhaust valve 11 to an exhaust line 12.

The arrangement comprises a return line 13 for recirculation of exhaust gases which extends from the exhaust line 12 to the inlet line 7. The return line 13 comprises a valve 14 and a cooler 15. The arrangement also comprises a pressure sensor 16 adapted to detecting the pressure in the combustion chamber 3 and a sensor 17 adapted to detecting the rotational position of the crankshaft 5. The sensor 17 may for example detect the position of the engine's flywheel. The arrangement comprises a schematically depicted hydraulic system 18a for lifting the inlet valve 8 and a schematically depicted hydraulic system 18b for lifting the exhaust valve 11. In this case, the lifting of the inlet valve 8 and the exhaust valve 11 takes place independently of the rotational position of the crankshaft. The arrangement comprises a control unit 19 adapted to controlling the engine 1 so that self-ignition of the fuel mixture takes place at an optimum crankshaft angle. The control unit 19 is adapted to receiving signals from the sensors 16, 17 and to sending control signals to the hydraulic systems 18a, b so that the lifting of the inlet valve 8 and the exhaust valve 11 takes place at desirable crankshaft angles. The control unit 19 may be a computer unit with suitable software.

Figure 2:
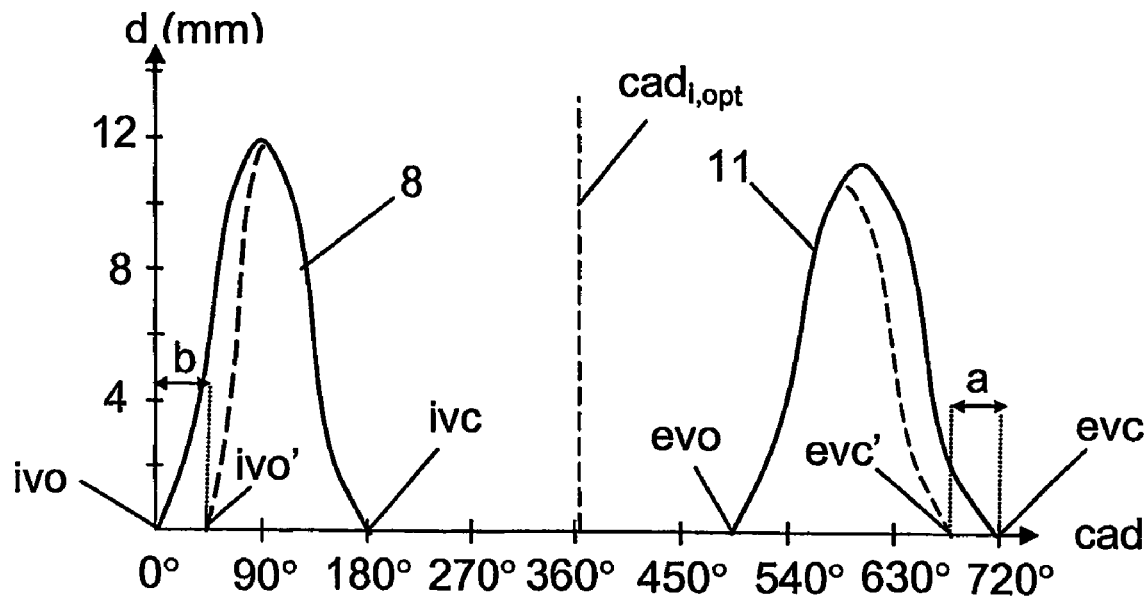
FIG. 2 depicts valve lifting of a combustion engine according to a first strategy.

FIG. 2 has continuous lines depicting a lifting phase d of an inlet valve 8 and a lifting phase d of an exhaust valve 11 as a function of the crankshaft angle cad (crank angle degree) when there is conventional control of the inlet valve 8 and the exhaust valve 11. In this case, the inlet valve opening ivo takes place substantially at the extreme top position of the piston 4 at a crankshaft angle here designated as 0°. The inlet valve closure ivc takes place just after the piston has passed the extreme bottom position at a crankshaft angle of 180°. In this case, the exhaust valve opening evo takes place at a crankshaft angle of about 500° and the exhaust valve closure evc takes place substantially at the piston's extreme top position at a crankshaft angle of 720°. As the engine 1 is a four-stroke engine, its working cycle comprises crankshaft rotation through 720°. Crankshaft angles of 0° and 720° are thus equivalent from the working cycle point of view. With conventional valve control, the exhaust valve closure evc and the inlet valve opening ivo take place substantially simultaneously or with a slight overlap so that the combustion chamber is emptied of exhaust gases after a combustion process. The optimum crankshaft angle $cad_{iopt}$ for self-ignition of the fuel mixture is substantially immediately after the piston 4 has passed the extreme top position at a crankshaft angle of 360°. The difficulty of supplying a fuel mixture which will self-ignite substantially exactly at the optimum crankshaft angle $cad_{iopt}$ is a contributory cause of HCCI engines having substantially not yet come into conventional use.

A first strategy I known per se for controlling the self-ignition of the fuel mixture to the optimum crankshaft angle $cad_{iopt}$ is to close the exhaust valve 11 before the piston 4 reaches the extreme top position at 720° and to open the inlet valve 8 after the piston 4 has passed the extreme top position at 0°. Such valve lifting involving early exhaust valve closure evc' and late inlet valve opening ivo' is represented by discontinuous lines in FIG. 2. Early exhaust valve closure evc' and late inlet valve opening ivo' cause a so-called negative overlap during a crankshaft angle range within which both the inlet valve 8 and the exhaust valve 11 are closed. In this case, the exhaust valve 11 is closed during a crankshaft angle range a before 720° and the inlet valve is closed during a crankshaft angle range b after 0°. The resulting negative overlap will be the aggregate of the crankshaft angle ranges a and b. Early exhaust valve closure evc' means that the combustion chamber 3 will not be entirely emptied of exhaust gases and that a certain amount of exhaust gases will be retained in the combustion chamber 3. Late opening of the inlet valve 8 means that the residual pressure of the exhaust gases will be reduced to a level such that they do not flow out through the inlet valve 8 when it opens. The negative overlap thus results in hot exhaust gases from a combustion process being retained in the combustion chamber until a subsequent combustion process. The hot exhaust gases retained heat the fuel mixture, causing earlier self-ignition. Suitable control of the inlet valve 8 and the exhaust valve 11 can be applied to cause a variable amount of exhaust gases to be retained in the combustion chamber 3 so that the self-ignition of the subsequent combustion process takes place substantially at the optimum crankshaft angle $cad_{iopt}$.

Figure 3:
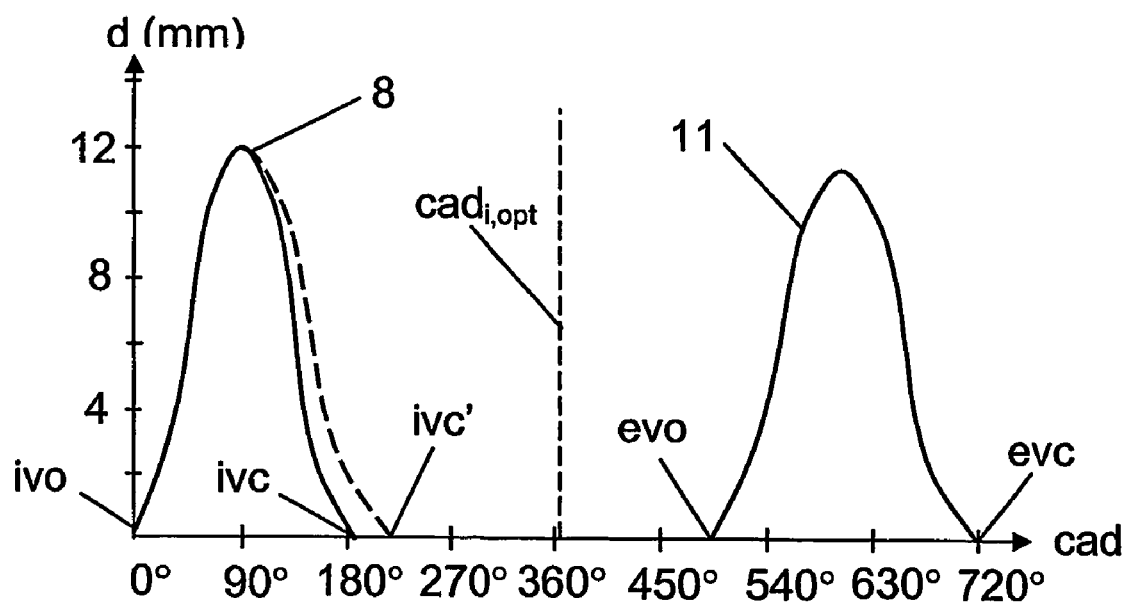
FIG. 3 depicts valve lifting of a combustion engine according to a second strategy.

A second strategy II known per se for controlling the self-ignition of fuel mixtures at different loads to a substantially optimum crankshaft angle $cad_{iopt}$ is to provide late inlet valve closure ivc'. FIG. 3 has continuous lines depicting a lifting phase d of the inlet valve 8 and a lifting phase d of exhaust valve 11 as a function of the crankshaft's angle of rotation cad (crank angle degree) when there is conventional lifting of the inlet valve 8 and the exhaust valve 11. Valve lifting resulting in late inlet valve closure ivc' is represented by discontinuous lines. In other respects the valve lifting according to strategy II takes place in a conventional manner as represented by the continuous line. Closing the inlet valve 8 at a late crankshaft angle ivc' reduces the piston movement required to compress the fuel mixture and results in a reduced effective compression ratio in the cylinder 2.

Figure 4:
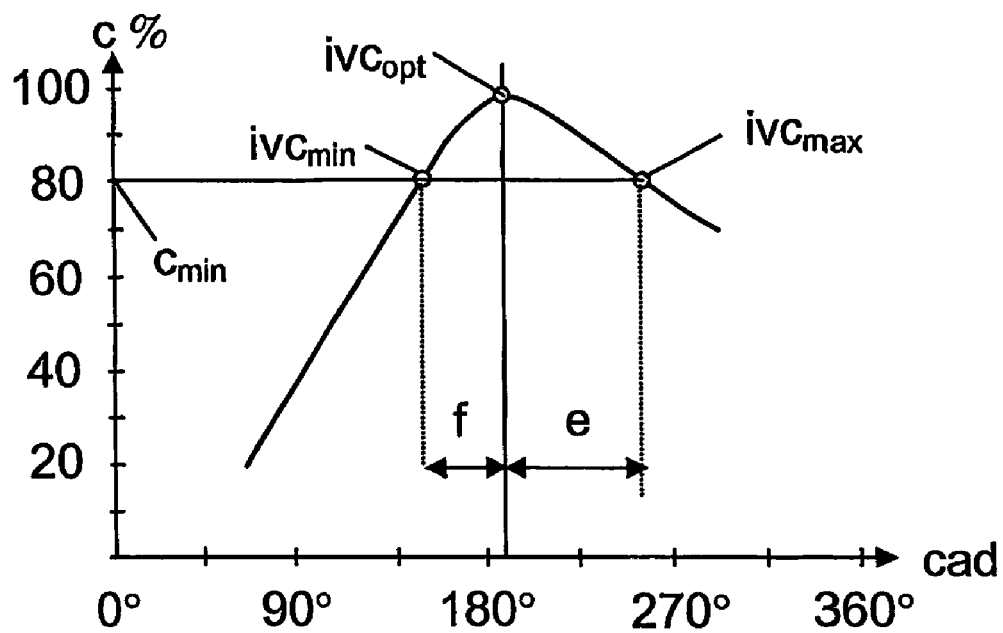
FIG. 4 depicts the effective compression ratio as a function of the crankshaft angle at inlet valve closure.

FIG. 4 shows how the effective compression ratio c varies as a function of inlet valve closure ivc at different crankshaft angles cad. It shows an optimum effective compression ratio c resulting from inlet valve closure $ivc_{opt}$ just after a crankshaft angle of 180°. Earlier or later than optimum inlet valve closure ivc results in a lower effective compression ratio c. A lower effective compression ratio c means that the compression to which the fuel mixture is subjected in the cylinder 2 is reduced, but the effective compression ratio c should not go below a minimum value $c_{min}$. Reduced effective compression ratio means that the lambda value, which can be measured by a lambda probe on the engine 1, falls, i.e. the sulphur content of the exhaust gases decreases. Lowering the lambda value results in corresponding pressure rises and increased emissions. The inlet valve closure ivc should therefore not deviate too much from the optimum inlet valve closure $ivc_{opt}$. FIG. 4 shows a maximum inlet valve closure $ivc_{max}$ not to be exceeded and a minimum inlet valve closure $ivc_{min}$ not to be undershot, in order to avoid going below the lowest acceptable effective compression ratio $c_{min}$. Thus later than optimum inlet valve closure ivc can be varied within a crankshaft angle range e and earlier than optimum inlet valve closure ivc can be varied within a crankshaft angle range f. Reduced compression ratio in the cylinder 2 results in delayed self-ignition. Controlling the inlet valve closure ivc to a crankshaft angle which is suitably far from the optimum $ivc_{opt}$ results in a reduced compression ratio in the cylinder 2 so that self-ignition takes place at an optimum crankshaft angle $cad_{iopt}$.

When the load of the engine 1 corresponds to an exactly ideal combination of fuel and air, the self-ignition of the fuel mixture due to compression heat takes place at the optimum crankshaft angle $cad_{iopt}$. When the load of the engine 1 is lower than ideal and the fuel mixture is leaner than ideal, the fuel mixture will not self-ignite by compression heat. In this case, strategy I can be applied to supply hot exhaust gases in a suitable quantity for raising the fuel mixture temperature so that self-ignition takes place at the optimum crankshaft angle $cad_{iopt}$. When the load of the engine 1 is higher than ideal and the fuel mixture richer than ideal, self-ignition due to compression heat takes place too early. In this case, strategy II can be applied for suitable reduction of the effective compression ratio c in the cylinder 2 so that self-ignition is delayed and takes place at the optimum crankshaft angle $cad_{iopt}$. Strategy I and strategy II are thus applicable within separate but mutually adjacent load ranges. Applying strategy I to leaner than ideal fuel mixtures and strategy II to richer than ideal fuel mixtures enables optimum self-ignition within a relatively large load range.

As the effective compression range c should not be limited too much, strategy II is not applicable for loads over a certain value. The composition of fuel mixtures for such high loads will be such that they self-ignite before the optimum crankshaft angle $cad_{iopt}$ even when there is maximum acceptable reduction of the effective compression ratio $c_{min}$. In this case a third strategy III may be applied. Strategy III entails cooled exhaust gases being led to the combustion chamber 3. The cooled exhaust gases cause the fuel mixture to ignite later. The control unit 19 can thus raise the effective compression ratio c by closing the inlet valve 8 somewhat closer to the optimum crankshaft angle $ivc_{opt}$. The acid content of the exhaust gases will rise and hence also the lambda value. The control unit 19 can then supply more fuel to the combustion chamber 3 to achieve a higher engine load. Supplying cooled exhaust gases causes the inlet valve closure ivc to shift to the left along the curve in FIG. 4 to an ivc value situated between $ivc_{max}$ and $ivc_{opt}$. Strategy III thus makes it possible also within this high load range to control the self-ignition of the fuel mixture by variation of the effective compression ratio c in the cylinder 2 without going below the lowest acceptable effective compression ratio $c_{min}$. Strategy III is thus applicable within a load range which is higher than the load range for strategy II. Applying control which comprises both strategy II and strategy III enables the control unit to control the self-ignition of fuel mixtures towards an optimum crankshaft angle $cad_{opt}$ within a relatively large load range.

Figure 5:
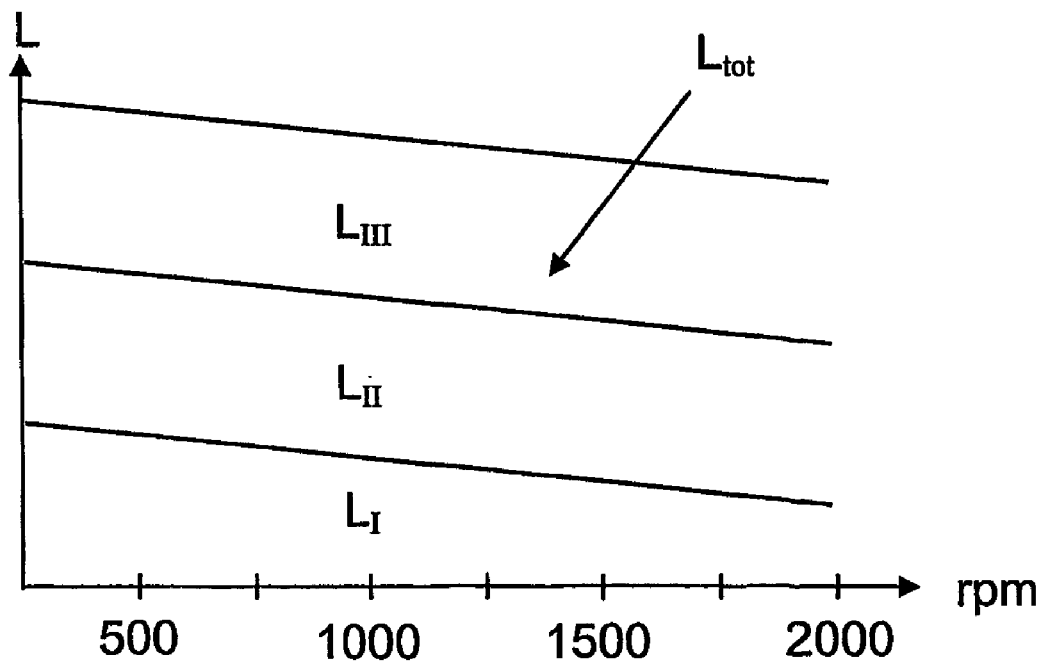
FIG. 5 depicts schematically three load subranges of a combustion engine controlled by three different strategies and FIG. 6 depicts a flowchart describing a method for controlling the self-ignition of a combustion engine.

With advantage, all three strategies I, II, II are applied to control the engine 1 within a load range $L_{tot}$ comprising the three subranges $L_I$, $L_{II}$, $L_{III}$. FIG. 5 depicts the three subranges $L_I$, $L_{II}$, $L_{III}$ schematically as a function of load L and engine speed rpm. Strategy I is applied in no-load and low-load running, strategy II in medium-load running and strategy m in high-load running. The various strategies I, II and III may thus be applied within the subranges $L_I$, $L_{II}$, $L_{III}$, which do of course overlap one another. Thus the control unit 19 can provide continuous control of the self-ignition of the engine 1 across a broad load range $L_{tot}$.

Figure 6:
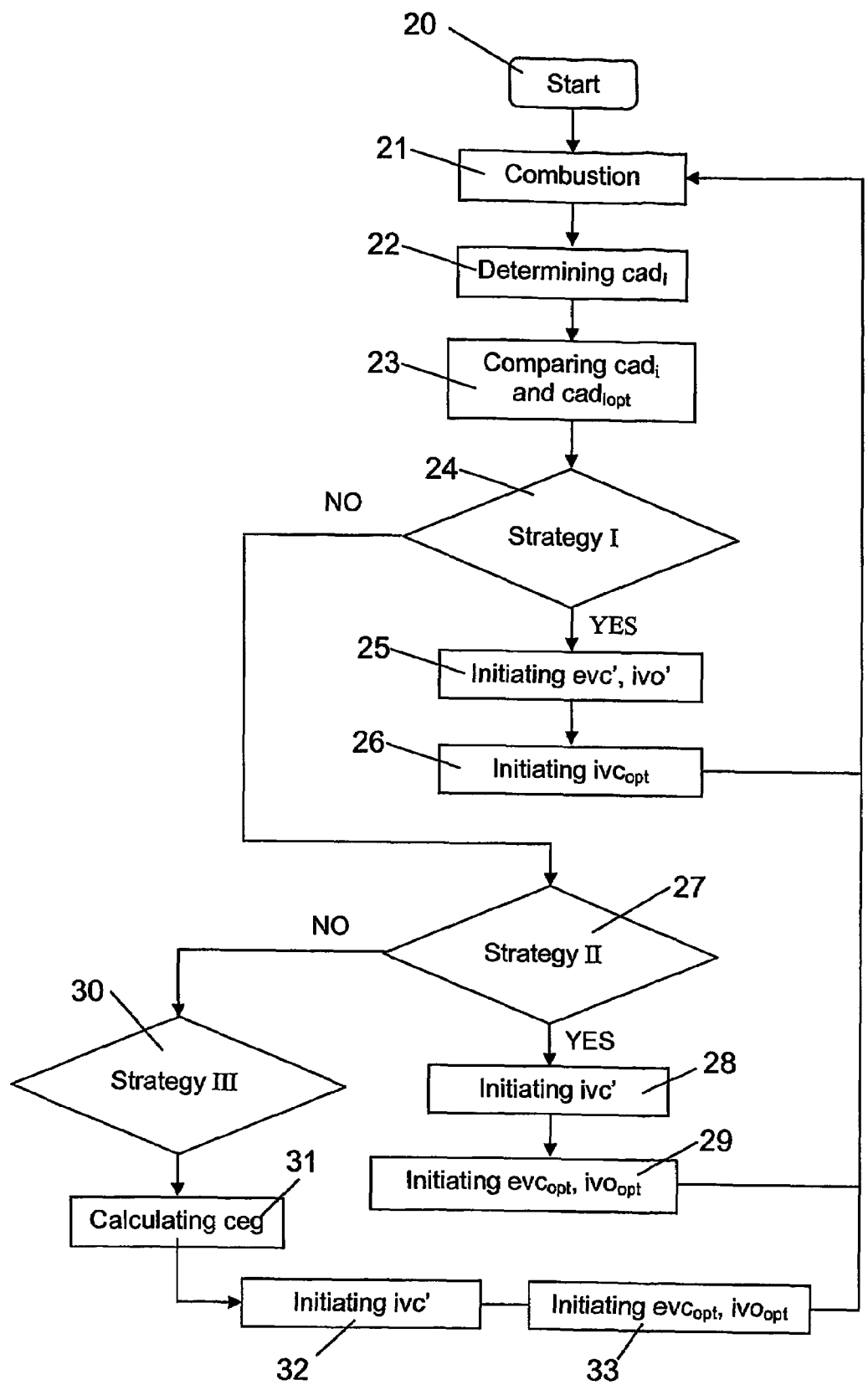

FIG. 6 depicts a flowchart describing a method for controlling the engine 1. At step 20 the engine starts up. At step 21 a combustion process takes place in the combustion chamber 3. The pressure sensor 16 detects the pressure characteristic in the combustion chamber 3. The pressure sensor 16 sends substantially continuously to the control unit 19 signals concerning the prevailing pressure in the combustion chamber 3. The control unit 19 also receives from the sensor 17 information concerning the current crankshaft angle. At step 22 the control unit 19 uses information about the pressure p in the combustion chamber 3 and the crankshaft angle cad to calculate the crankshaft angle $cad_i$ at which the self-ignition of the combustion process has taken place. The control unit 19 comprises stored reference values concerning an optimum crankshaft angle $cad_{i,opt}$ at which self-ignition should take place. At step 23 the control unit 19 compares the actual crankshaft angle cad; at self-ignition and the optimum crankshaft angle $cad_{i,opt}$ for self-ignition. If $cad_i$ is greater than $cad_{i,opt}$, the combustion process started late and the control unit 19 is adapted to taking action for promoting earlier self-ignition in the subsequent combustion process. If $cad_i$ is smaller than $cad_{i,opt}$, the combustion process started early and the control unit 19 is adapted to taking action for promoting later self-ignition in the next combustion process.

At step 24 the control unit 19 estimates whether it is possible to control by means of strategy I the self-ignition of the subsequent combustion process. If $cad_i$ is greater than $cad_{i,opt}$, the latest combustion process started late and a somewhat larger amount of hot exhaust gases should therefore have been supplied to the combustion process. If $cad_i$ is smaller than $cad_{i,opt}$ the latest combustion process started early and a somewhat smaller amount of hot exhaust gases should therefore have been supplied to the combustion process. At step 25 the control unit 19 initiates new values for the exhaust valve closure evc' and the inlet valve opening ivo' so that an adjusted amount of exhaust gases is retained in the combustion chamber during the subsequent combustion process. At step 26 the control unit 19 initiates inlet valve closure at the crankshaft angle $ivc_{opt}$ at which there will be optimum compression in the cylinder 2. If it is not possible to reduce further the amount of exhaust gases retained in the combustion chamber, it may be found that the load is too high for strategy I to be applicable for controlling the self-ignition of the subsequent combustion process to the optimum crankshaft angle for self-ignition $cad_{i,opt}$.

At step 27, if the self-ignition cannot be controlled by means of strategy I, there is estimation of whether it is possible to control the self-ignition by applying strategy II. Strategy II entails inlet valve closure ivc' earlier or later than the optimum $ivo_{opt}$. This means that the effective compression ratio c in the cylinder 2 can be reduced and the self-ignition delayed. Strategy II may thus be applied when the characteristics of the fuel mixture supplied are such that it self-ignites at too early a crankshaft angle during the compression in the cylinder 2. The effective compression ratio c should thus not be lowered below a minimum value $c_{min}$. The inlet value closure ivc' is therefore limited to the crankshaft angle ranges e, f depicted in FIG. 4. If the control unit 19 estimates an inlet valve closure ivc' which is neither above $ivc_{max}$ nor below $ivc_{min}$, strategy II may be applied for controlling the self-ignition. If cads is greater than $cad_{i,opt}$, the latest combustion process started late, so the control unit 19 adjusts the inlet valve closure ivc' of the subsequent combustion process to a suitable extent towards $ivc_{opt}$ in order to raise the compression ratio c in the cylinder 2. If, on the contrary, $cad_i$ is smaller than $cad_{i,opt}$, the latest combustion process started early, so the control unit adjusts the inlet valve closure ivc' of the subsequent combustion process to a suitable extent away from $ivc_{opt}$ in order to reduce further the compression ratio c in the cylinder 2. If the new ivc' value calculated by the control unit 19 falls within the crankshaft angle ranges e, f, it is therefore possible to apply strategy II for controlling the subsequent combustion process. In that case, at step 28 the control unit 19 initiates closure of the inlet valve 8 at the calculated inlet valve closure ivc'. At step 29 the control unit 19 initiates exhaust valve closure $evc_{opt}$ and inlet valve opening $ivo_{opt}$ at crankshaft angles which result in minimum fuel consumption. The exhaust valve opening evo is controlled to a suitable value by overall engine parameters which are independent of strategy II.

If the control unit 19 estimates an ivc' value which does not fall within the crankshaft angle ranges e, f, it is not appropriate simply to use a reduced compression ratio for controlling the self-ignition towards the optimum crankshaft angle $cad_{iopt}$. In such cases the composition of the fuel mixture will be such that controlling the self-ignition towards the optimum crankshaft angle $cad_{i,opt}$ would entail reducing the compression ratio c to a value below $c_{min}$. At step 30 the control unit 19 therefore applies strategy III, which entails cooled exhaust gases being led to the combustion chamber. If $cad_i$, is greater than $cad_{i,opt}$, the latest combustion process started late and the control unit controls the valve 14 so that a smaller amount of cooled exhaust gases is led to the subsequent combustion process. If $cad_i$, is smaller than $cad_{i,opt}$, the combustion process started early and the control unit controls the valve 14 so that a larger amount of cooled exhaust gases is led to the subsequent combustion process. At step 31 the control unit then calculates the amount of cooled exhaust gases ceg which should be supplied to the combustion chamber 3 for self-ignition of the fuel mixture to take place at the optimum crankshaft angle $cad_{i,opt}$. Supplying a suitable amount of cooled exhaust gases ceg results in later combustion of the fuel mixture. The ivc value is thus shifted to the left along the curve in FIG. 4 to an ivc value situated between $ivc_{max}$ and $ivc_{opt}$. At step 32 the control unit 19 raises the compression ratio c by initiating an inlet valve closure ivc' which is situated between the optimum inlet valve closure $ivc_{opt}$ and $ivc_{max}$. The lambda value is thus raised, enabling more fuel to be supplied to the combustion chamber and a higher engine load to be achieved. At step 33 the control unit 19 initiates exhaust valve closure $evc_{opt}$ and inlet valve opening $ivo_{opt}$ at crankshaft angles which result in minimum fuel consumption. The exhaust valve opening evo is controlled by overall engine parameters which are independent of strategy III.

The invention is in no way limited to the embodiment to which the drawings refer but may be varied freely within the scopes of the claims. The combustion engine need not be an HCCI engine but may be any desired combustion engine in which a homogeneous fuel mixture self-ignites by compression. The drawings refer to one cylinder of the combustion engine 1 but the number of cylinders may of course be varied, as also the number of other components such as valves, injection means etc.

The invention claimed is:

1. An arrangement for controlling a combustion engine wherein
    the combustion engine comprises a combustion chamber, a movable piston in the combustion chamber and the piston being movable to compress a fuel mixture in the combustion chamber so that self-ignition of the fuel mixture takes place, a crankshaft connected to and driven by movements of the piston;
    an inlet valve to the combustion chamber and an exhaust valve from the combustion chamber;
    a control unit operable for controlling the self-ignition of the fuel mixture to an optimum crankshaft angle ($cad_{iopt}$) of the crankshaft within a load range ($L_{tot}$), wherein the load range ($L_{tot}$) is divided into at least two subranges ($L_{II}$, $L_{III}$) and the control unit is operable for controlling the self-ignition of the fuel mixture towards the optimum crankshaft angle ($cad_{iopt}$) of the crankshaft within a first one of the subranges ($L_{II}$) by a strategy (II) of varying the effective compression ratio (c) in the cylinder within a range bounded downwards by a lowest acceptable compression ratio $c_{min}$), and within a second one of the subranges ($L_{III}$) by a strategy (III) which entails leading cooled exhaust gases (ceg) to the combustion chamber in a quantity also enabling within the second subrange ($L_{III}$) control of the self-ignition of the fuel mixture towards the optimum crankshaft angle ($cad_{iopt}$) of the crankshaft by variation of the effective compression ratio (c) within the range bounded downwards by the lowest acceptable compression ratio ($C_{min}$).

2. An arrangement according to claim 1, wherein the control unit is adapted to regulating the effective compression ratio (c) in the cylinder by initiating variable closure of the inlet valve (ivc).

3. An arrangement according to claim 2, further comprising a hydraulic control system operable for controlling the variable inlet valve closure (ivc).

4. An arrangement according to claim 1, further comprising an exhaust line of the combustion engine from the exhaust valve an inlet line to the inlet valve for air supply to the combustion chamber, and a return line extending from the exhaust line to the inlet line.

5. An arrangement according to claim 4, wherein the return line comprises a valve for controlling the supply of exhaust gases to the inlet line.

6. An arrangement according to claim 4, wherein the return line further comprises a cooler operable for cooling the exhaust gases before they reach the inlet line.

7. An arrangement according to claim 1, further comprising a first sensor for detecting a parameter (p) which indicates the start of a combustion process in the combustion chamber, and a second sensor for estimating the crankshaft angle (cad) of the crankshaft, and the control unit is operable for determining the crankshaft angle ($cad_i$) for the start of the combustion process.

8. An arrangement according to claim 7, wherein the first sensor is a pressure sensor operable for detecting the pressure (p) in the combustion chamber.

9. An arrangement according to claim 7, wherein the control unit is operable for comparing the estimated crankshaft angle ($cad_i$) at the self-ignition of the combustion process with stored information concerning the optimum crankshaft angle ($cad_{iopt}$) for self-ignition of the combustion process and for using that information for controlling the self-ignition of the following combustion process.

10. An arrangement according to claim 1, further comprising an injection nozzle operable for injecting fuel into the combustion chamber when the inlet valve is open.

11. A method for controlling a combustion engine wherein the combustion engine comprises a combustion chamber, a movable piston in the combustion chamber and the piston being movable to compress a fuel mixture in the combustion chamber so that self-ignition of the fuel mixture takes place, a crankshaft connected to and driven by movements of the piston;
    an inlet valve to the combustion chamber and an exhaust valve from the combustion chamber;
    the method comprising:
    controlling the self-ignition of the fuel mixture towards an optimum crankshaft angle ($cad_{iopt}$) of the crankshaft within a load range ($L_{tot}$), that is divided into at least first and second subranges ($L_{II}$, $L_{III}$); controlling the self-ignition of the fuel mixture towards the optimum crankshaft angle ($cad_{iopt}$) within the first subrange ($L_{II}$) by a strategy (II) of varying the effective compression ratio (c) in the cylinder within a range bounded downwards by a lowest acceptable compression ratio ($C_{min}$), and within the second subrange ($L_{III}$) by a strategy (III) of leading cooled exhaust gases (ceg) to the combustion chamber in a quantity also enabling within the second subrange ($L_{III}$) control of the self-ignition of the fuel mixture towards the optimum crankshaft angle ($cad_{iopt}$) of the crankshaft by variation of the effective compression ratio (c) within the range bounded downwards by the lowest acceptable compression ratio ($C_{min}$).

12. A method according to claim 11, further comprising regulating the effective compression ratio in the cylinder by initiating variable inlet valve closure (ivc).

13. A method according to claim 12, further comprising controlling the variable inlet valve closure (ivc) by a hydraulic control system.

14. A method according to claim 11, further comprising leading cooled exhaust gases (ceg) to the combustion chamber via a return line extending from an exhaust line of the combustion engine from the exhaust valve to an inlet line to the inlet valve for air supply to the combustion chamber.

15. A method according to claim 14, further comprising valve controlling the supply of exhaust gases to the inlet line.

16. A method according to claim 14, further comprising cooling the exhaust gases before they reach the inlet line.

17. A method according to claim 11, further comprising determining the crankshaft angle ($cad_i$) at the start of the combustion process by detecting a parameter (p) which is related to the combustion process in the combustion chamber, and by detecting the crankshaft angle (cad) of the combustion engine.

18. A method according to claim 17, wherein the parameter detected is the pressure (p) in the combustion chamber.

19. A method according to claim 17, further comprising comparing the estimated crankshaft angle ($cad_i$) at the start of the combustion process with stored information concerning the optimum crankshaft angle ($cad_{i_{opt}}$) for the start of the combustion process, and using that information for controlling the self-ignition of the following combustion process.

20. A method according to claim 11, further comprising injecting fuel into the combustion chamber when the inlet valve is open.

* * * * *